United States Patent [19]
Maigret

[11] 4,071,884
[45] Jan. 31, 1978

[54] INTEGRATED CIRCUIT HIGH VOLTAGE DC CONVERTER

[75] Inventor: Robert J. Maigret, Warwick, R.I.

[73] Assignee: Micro Components Corporation, Cranston, R.I.

[21] Appl. No.: 695,636

[22] Filed: June 14, 1976

[51] Int. Cl.² .......................................... H02P 13/22
[52] U.S. Cl. .................................. 363/21; 315/241 P; 363/95
[58] Field of Search ...................... 321/2, 18; 315/135, 315/219, 241 P; 354/145; 363/21, 95, 97

[56] References Cited

U.S. PATENT DOCUMENTS

| | | | |
|---|---|---|---|
| 3,213,344 | 10/1965 | Jensen | 315/241 P |
| 3,660,753 | 5/1972 | Judd et al. | 321/2 |
| 3,771,040 | 11/1973 | Fletcher et al. | 321/2 |
| 3,859,563 | 1/1975 | Vogt | 321/2 |
| 3,919,625 | 11/1975 | Barton | 321/2 |

*Primary Examiner*—William H. Beha, Jr.
*Attorney, Agent, or Firm*—Charles E. Pfund

[57] ABSTRACT

A step-up DC converter suitable for construction as an integrated circuit chip provides a separate rectangular wave oscillator using a silicon transistor and a power amplifier driven thereby which supplies current to the primary winding of a two-winding step-up transformer matched to the constant duty cycle of the oscillator thereby simplifying construction of the transformer and permitting the oscillator and power amplifier voltage step-up transformer functions to be individually optimized for overall high efficiency operation. A hysteresis switching voltage comparator senses the rectified value of the high voltage output from the transformer relative to a stable reference voltage and switches both the oscillator and the amplifier to their standby current condition when a predetermined high output voltage level is obtained and switches both oscillator and amplifier into conduction when the output voltage falls to a predetermined level. A second comparator operates an LED indicator when the output voltage is above a certain level.

4 Claims, 2 Drawing Figures

INTEGRATED CIRCUIT HIGH VOLTAGE DC CONVERTER

BACKGROUND OF THE INVENTION

The present invention relates generally to DC step-up voltage converters particularly of the type wherein the output is rectified to provide DC to DC conversion typically used to supply a high DC operating voltage for an electronic photographic flash tube with power supplied from low voltage DC batteries. Numerous circuit configurations for supplying the DC to DC conversion function have been provided in the past with emphasis given to continually improving the light weight and low power consumption characteristics of such devices in order that small portable and self-contained units may be manufactured and sold at reasonable prices.

In the prior art circuits the conventional arrangement has been to provide a blocking type oscillator in the form of a transformer having three windings one of which is the load for an oscillating active element such as a transistor with a secondary winding of a large number of turns providing a substantial step-up in voltage in accordance with the primary-secondary turns ratio. The third winding on the transformer is employed to provide the feedback in association with time constant circuits to permit the transistor-transformer combination to operate as a blocking oscillator. Such arrangements generally have a variable frequency during the charging cycle as the current loading on the oscillator varies as the output voltage approaches the maximum level. Thus the transformer cannot be optimized as to efficient energy transfer at constant frequency and duty cycle and the corresponding size and cost are not optimally minimum. Typical of these and similar prior art circuits are found in U.S. Pat. Nos. 3,310,723, 3,831,079 and 3,917,975. While two winding transformers (i.e., a primary and secondary winding without a third feedback winding) have been employed in photo-flash type circuits, e.g., U.S. Pat. No. 3,679,991, such arrangements have sometimes involved a connection to the high voltage secondary winding and an oscillating transistor connected to the primary winding with interconnection of the two to provide the necessary feedback for oscillation. Because of the high voltages involved in such photo-flash converters, it is generally desirable to isolate the secondary high voltage circuit.

In other such circuits the functions of the oscillator and power drive for the transformer cannot be independently optimized. Typically, a duty cycle feedback control is employed which varies the "mark-space" duty cycle such that the transformer is not matched to a constant steady-state duty cycle for the duration of the charging cycle (cf Electronics pp 95–7 Mar. 6, 1975 and Motorola Semiconductor Products, Inc. Application Note AN-442). In order to conserve battery drain in such circuits, germanium transistors are ordinarily used and a hysteresis effect employing a neon tube is generally relied upon to switch the circuit between active oscillation for charging the capacitor and a reduced conversion level state during the time the output voltage is high enough to maintain discharge in a neon tube connected across a portion of the output voltage. The present invention utilizes silicon transistors adapted to monolithic construction and low loss in a stand-by off condition of very low current thus achieving economy of cost and conservation of battery energy with the on-off condition controlled by an accurate hysteresis voltage comparator. While voltage comparator circuits more accurate than neon tubes have been employed in the prior art, e.g., U.S. Pat. No. 3,863,128, arrangements such as these generally employed two reference zener diode devices or the like for establishing the two levels for control of the oscillator and thus unduly add to the complexity and expense of such arrangements.

SUMMARY OF THE INVENTION

It is, accordingly, the object of the present invention to provide an improved DC step-up converter circuit sutiable for DC to DC conversion application such as self-contained photoflash units in which independently operating oscillator and power amplifier driver for the step-up transformer are provided operating with rectangular waveform at constant duty cycle thereby to permit optimization of both the oscillator and the amplifier-transformer circuits relatively independent of each other to obtain a high conversion efficiency and thus low battery drain. Silicon transistors are used to permit integrated circuit construction and low stand-by current to further inmprove economy in construction and efficient energy use and conservation. At the same time the circuit is provided with features which maintain the output voltage substantially constant within a narrow accurately controlled hysteresis switching upper and lower limit with substantially complete turn-off of all current drain during the period when the output voltage is maintained above the lower limit. It is a further object of the invention to provide accurate voltage comparison levels for both circuit control and operating voltage level indication using a single voltage reference device with switching in the comparator circuit to provide the desired hysteresis. Thus, the principal object of the invention is to provide a low cost, small size DC to DC converter suitable for a self-contained photo-flash unit which operates at high efficiency and has a very short recycle time.

These and other objects of the invention will be apparent from the following detailed description taken in conjunction with the accompanying drawing.

DESCRIPTION OF THE PREFERRED EMBODIMENT

Figure 1:
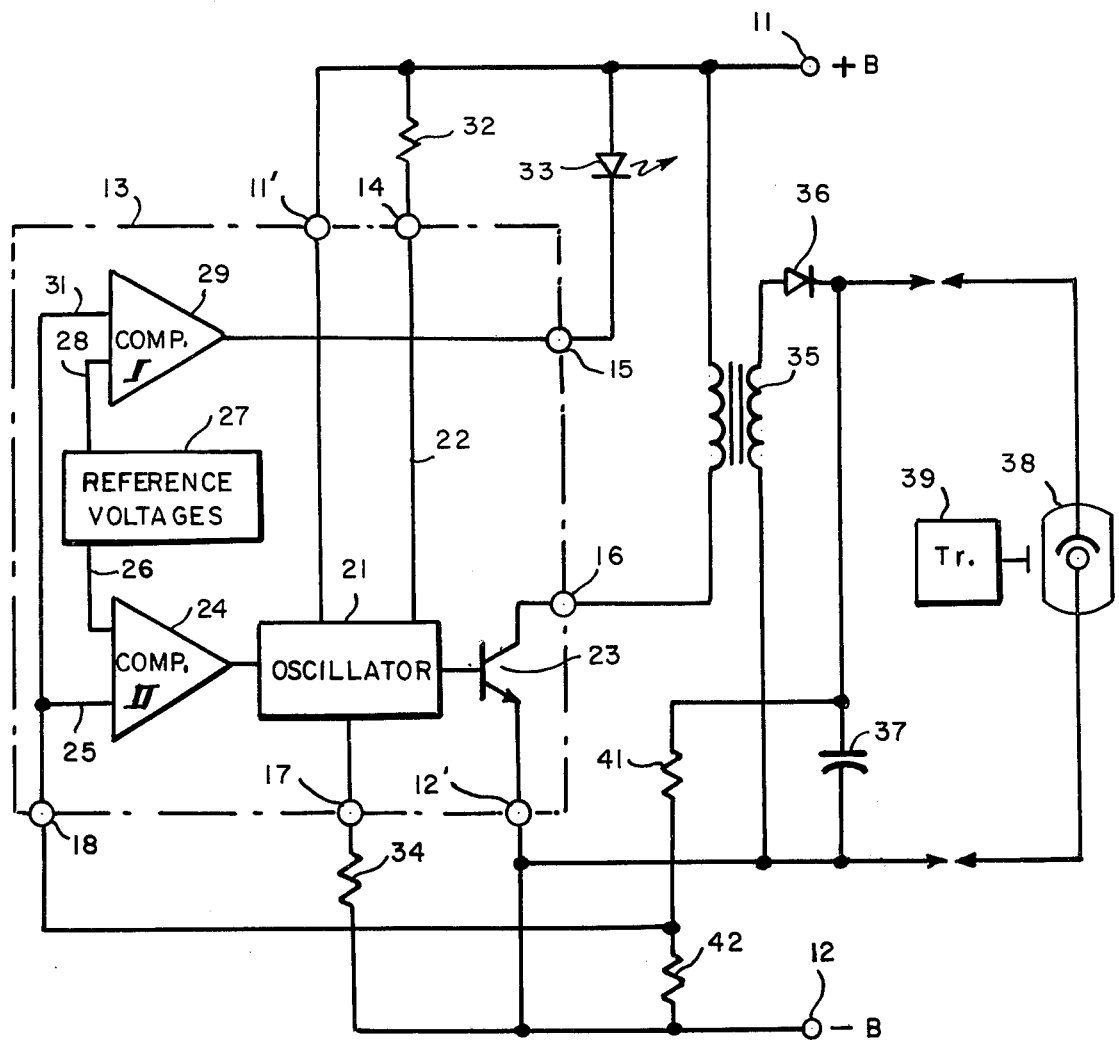
FIG. 1 is a block diagram partly schematic showing the general arrangement in accordance with the invention.

Referring to FIG. 1, the circuit is shown as comprising a plus battery terminal 11 and a common ground negative battery terminal 12 to which is connected the low voltage battery source used to power the unit. An integrated circuit chip generally shown within the outline 13 has low voltage DC power terminals 11' and 12' connected to the correspondingly numbered battery terminals, a driver amplifier terminal 14, an indicator terminal 15, a power amplifier terminal 16, an oscillator terminal 17 and comparator input terminal 18.

On the integrated circuit chip 13 a rectangular wave oscillator 21 is connected between terminals 11' and 17. Within the oscillator 21, as will hereinafter appear, a driver amplifier is arranged to have an external load by connection to terminal 14 via conductor 22 and a power transistor 23 is connected with its base driven by the internal driver amplifier, its collector connected to terminal 16 and its emitter connected to terminal 12'.

A first voltage comparator circuit 24 is arranged with its output connected to control oscillator 21 as comparator 24 switches in response to changes in the two input voltage levels applied on lines 25, 26. Input line 25 is connected to terminal 18, while input line 26 is connected to a point of reference potential on a reference voltage device 27. The reference voltage device is connected to terminal 11' and provides in addition to a first voltage level on output line 26 a second output voltage level on line 28. The voltage on line 28 is applied at one input of a second voltage comparator 29, the second input of which is derived from terminal 18 on line 31. The output of the second comparator 29 is applied to terminal 15.

External to the integrated circuit chip 13 are a driver amplifier resistor or impedance 32 connected from battery terminal 11 to terminal 14, LED indicator device 33 connected from battery terminal 11 to terminal 15 and a frequency determining resistor or impedance 34 connected from terminal 17 to the negative battery terminal 12.

The remaining connection to the integrated circuit chip 13 comprises the primary winding of a step-up transformer 35 which is optimized to match the rectangular wave duty cycle of the power transistor 23 which supplies fixed duty cycle current pulses to its primary winding. Typically, the transformer 35 is a device with ferrite core having a small air gap to prevent saturation with primary and secondary windings tightly coupled. The constant frequency and a rectangular wave of specified duty cycle permit the transformer design to be optimized for efficiency to conserve battery energy while providing short recycle time in photo-flash service. The primary winding transformer 35 is connected from battery terminal 11 to power amplifier terminal 16. The secondary winding of the transformer 35 provides high voltage when the primary winding is energized with alternating current and this high voltage may be rectified by any suitable rectifier circuit indicated at 36 to charge storage capacitor 37. It will be understood that many rectifier arrangements are known and the utilization of the high voltage produced by the secondary winding of transformer 35, while indicated in FIG. 1 in accordance with a particular circuit is not to be considered as limited to such circuits since many utilization devices for both the AC and rectified DC which can be derived from the secondary of transformer 35 will find the advantages of the present invention to be useful therein. As indicated in FIG. 1, the high voltage DC across storage capacitor 37 can be applied to a photo-flash tube 38 for operation in conjunction with a camera by the application of a triggering signal by means indicated at 39.

The voltage level present across storage capacitor 37 is divided across a voltage divider 41, 42, and the portion thereof across resistor 42 is applied to terminal 18 as one input to the comparators 24 and 29 found on the IC chip 13.

Figure 2:
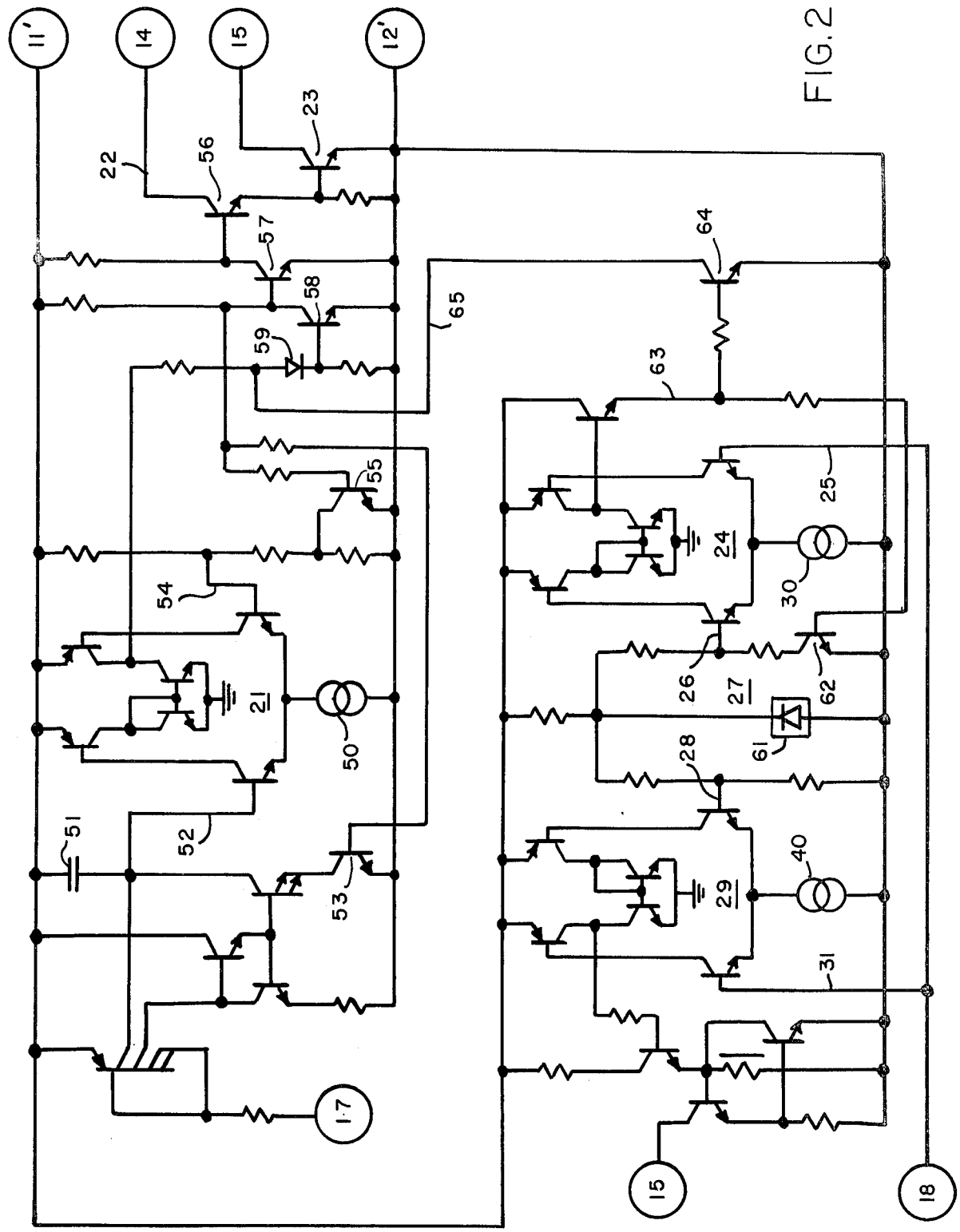
FIG. 2 is a schematic diagram showing further details of the arrangement of FIG. 1 and arranged in a manner suitable for embodiment as a single chip integrated circuit.

Referring now to FIG. 2, further details of the circuit of FIG. 1 will be described as they pertain to the novel features of the invention. It will be understood, however, that FIG. 2 represents a best mode embodiment for integrated circuit purposes of the invention and to the extent that details of conventional integrated circuit operations are known in the art only a brief functional description will be given. To the extent that the same parts are shown in FIG. 2 as have been described in FIG. 1, the same reference numerals are applied.

The oscillator 21 is an astable silicon transistor circuit operating with a constant current source 50 to oscillate at a frequency having predetermined on-off duty cycle (for example 75% on and 25% off) determined by the time constant of a capacitor 51 and the resistor connected at terminal 17 as previously described. The capacitor 51 is connected to an input lead 52 to the astable circuit 21 which lead is returned to ground or common terminal 12' through a switching transistor 53 controlled as hereinafter described. A second control input to oscillator 21 at line 54 is normally operatively biased for oscillation but controllable by switching transistor 55 to a bias point which will terminate oscillations as hereinafter described.

The power transistor 23 connected to the primary winding of the step-up transformer at terminal 15 is driven by a driver transistor 56 which has its collector connected via line 22 to terminal 14 to which is connected the resistor 32 as described in FIG. 1. The transistor 56 is driven by rectangular wave shaping inverting amplifiers 57, 58, to provide efficient switching wave forms for operation of the transistor 23 and its transformer load. The application of the output of oscillator 21 to the base of transistor 58 is via a circuit path which includes a normally conducting diode 59 which, however, can be controlled to be non-conducting in accordance with the switched condition of comparator.

The reference voltage device 27 is an active circuit of the type known as a silicon band-gap voltage type represented at 61 as including a reference diode. Such band-gap reference devices can be obtained with reference voltage 1.2 volts which is unattainable with ordinary zener diodes and thus the present system operates with regulation down to battery voltages of 1.5 volts. The regulator 61 provides a constant reference voltage at line 28 for comparator 29 and a different constant voltage at line 26 as an input to comparator 24. The comparators 24 and 29 operate from respective constant current sources 30 and 40. The voltage on line 26 is derived from a voltage divider which includes a switching transistor 62 which is controlled by a signal applied to its base derived from the switched output of the comparator 24 on line 63. As previously noted, the other input to comparator 24 on line 25 is derived from terminal 18 and corresponds to a fixed fraction of the voltage across storage capacitor 37 of FIG. 1. The switched output of the comparator 24 on line 63 is applied through a transistor 64 as the signal on line 65 controlling conductance in diode 59.

A brief description of the operation of the circuit thus far described will now be given. Initially, with no voltage across storage capacitor 37 the comparator 24 is in a switched condition which renders diode 59 conductive and this condition biases transistor 58 to cut off transistor 55 thereby biasing oscillator 21 to oscillate. Oscillations from oscillator 21 are passed through the amplifier cascade 58, 57, 56, 23, to produce high voltage at the output of transformer 35 which is rectified by rectifier 36 to begin charging capacitor 37. As the voltage on capacitor 37 reaches a level on line 25 of comparator 24 which switches the output thereof the altered voltage level on output line 63 is applied on line 65 to cut off diode 59 which through the amplifier chain cuts off amplifier 23. Similarly, the cut off signal condition switches transistor 55 to alter the bias of oscillator 21 to cause it to cease oscillation. Also the swithced condition of comparator 24 modifies the conductance of transistor 62 thereby assuring that the comparator 24 will not revert to its original state upon discharge of capacitor 37 until a predetermined reduction has occurred such as 0.96 of its original value. When that reduced value is reached comparator 24 reverts to its original state as do the other switching elements to start oscillations in oscillator 21, amplification through the amplifier to drive the transformer through transistor 23 and to revert the switching point of comparator 24 to its original value by returning transistor 62 to its original conductance.

The foregoing sequence assures that the output voltage at capacitor 37 will always reach peak value irrespective of the condition of the battery supply provided it is adequate to sustain oscillations and the discharge condition for recharging the capacitor 37 can be selected to be very close to the maximum value such as 0.96 $V_{max}$. On the other hand, when capacitor 37 is charged above this level all of the major current drawing circuits are rendered non-conductive to conserve battery energy.

The comparator 29 operates with respect to the voltage on storage capacitor 37 a portion of which is applied on line 31 as previously described and upon this voltage reaching a predetermined level relative to the voltage on line 28 the comparator 29 switches to energize an indicator such as an LED connected to terminal 15.

The objectives of the present invention will now be understood as achieved by the disclosed embodiment which can be modified in many respects without departing from the spirit and scope of the invention. The invention, accordingly, is considered to include such modifications as are within the scope of the appended claims.

I claim:
1. A high voltage DC converter comprising:
   a low voltage DC supply;
   a rectangular wave oscillator of constant duty cycle comprising a high current silicon transistor connected to said supply and controlled for oscillation or non-oscillation by the condition of a control signal applied thereto;
   a two-winding high voltage step-up transformer matched to the duty cycle of said oscillator;
   power amplifier means having an input circuit driven by said oscillator and an output circuit connected through the primary winding of said transformer to said supply;
   a voltage comparator having switching hysteresis;
   a reference voltage source derived from said supply;
   means for applying a constant voltage derived from said reference voltage source and a voltage representative of the output voltage from the secondary winding of said transformer to control switching in said voltage comparator to selectively provide a high voltage condition or a low voltage condition at the output of said comparator in response to the relative magnitudes of said applied voltages, and
   means for coupling the switching output of said comparator as said control signal to control on-off switching of said oscillator,
      said oscillator and said power amplifier are switched to be inactive at substantially low current condition for the high voltage output condition of said comparator,
      wherein said oscillator, said power amplifier, said reference voltage source and said comparator comprise a single chip silicon integrated circuit with an oscillator terminal and a power amplifier output terminal and including: frequency controlling circuit means connected to said oscillator terminal; and
      a circuit connecting to said primary winding from one terminal of said DC supply to said output terminal.

2. Apparatus according to claim 1 wherein said integrated circuit chip includes a driver amplifier for said power amplifier and a terminal for connection of a drive impedance for said driver amplifier.

3. Apparatus according to claim 2 and including a high voltage rectifier circuit means coupled to the secondary winding of said transformer.

4. Apparatus according to claim 3 wherein said integrated circuit chip further includes:
   a second voltage comparator;
   means for applying a constant voltage derived from said reference voltage source and a second voltage representative of the rectified output of said rectifier circuit means to control switching in said second voltage comparator at a predetermined voltage level of said rectified coutput; and
   indicator means responsive to the switching output of said second voltage comparator for indicating the level of said rectified output relative to said predetermined voltage level.

* * * * *